United States Patent
Lee

[11] Patent Number: 5,852,544
[45] Date of Patent: Dec. 22, 1998

[54] POWER CONNECTION BRACKET FOR COMPUTER SYSTEM AND COMPUTER SYSTEM HAVING THE SAME

[75] Inventor: Ju-Hun Lee, Suwon, Rep. of Korea

[73] Assignee: SamSung Electronics Co., Ltd., Suwon, Rep. of Korea

[21] Appl. No.: 840,588

[22] Filed: Apr. 22, 1997

[30] Foreign Application Priority Data

Apr. 22, 1996 [KR] Rep. of Korea .................. 1996-12200

[51] Int. Cl.⁶ ................................ G06F 1/16; H05K 7/10
[52] U.S. Cl. ........................... 361/683; 361/825; 361/827
[58] Field of Search ..................................... 361/683, 684, 361/686, 827, 826, 825; 439/502, 61, 562, 564; 307/150

[56] References Cited

U.S. PATENT DOCUMENTS

| | | |
|---|---|---|
| 1,278,997 | 9/1918 | Pieper et al. . |
| 4,188,653 | 2/1980 | Goepel . |
| 5,106,322 | 4/1992 | Cesar . |
| 5,187,645 | 2/1993 | Spalding et al. . |
| 5,301,346 | 4/1994 | Notarianni et al. . |
| 5,598,318 | 1/1997 | Dewitt et al. ............................ 361/683 |
| 5,650,911 | 7/1997 | Scholder et al. ....................... 439/61 X |

*Primary Examiner*—Lynn D. Feild
*Attorney, Agent, or Firm*—Robert E. Bushnell, Esq.

[57] ABSTRACT

Disclosed is a computer assembly containing an internal power supply that powers both peripherals located within the housing of a computer and peripherals located external to the housing of the computer. The above is accomplished by using a bracket designed to use only internal supply voltage, without the use of an adapter, to connect a computer system to external peripheral devices. The bracket which is attached to an expansion slot of a computer housing, and is made up of a first connecting part, and a second connecting part. The second connecting part is electrically connected to the first connecting part, whereby said bracket is capable of using internal supply voltage of the computer system.

7 Claims, 3 Drawing Sheets

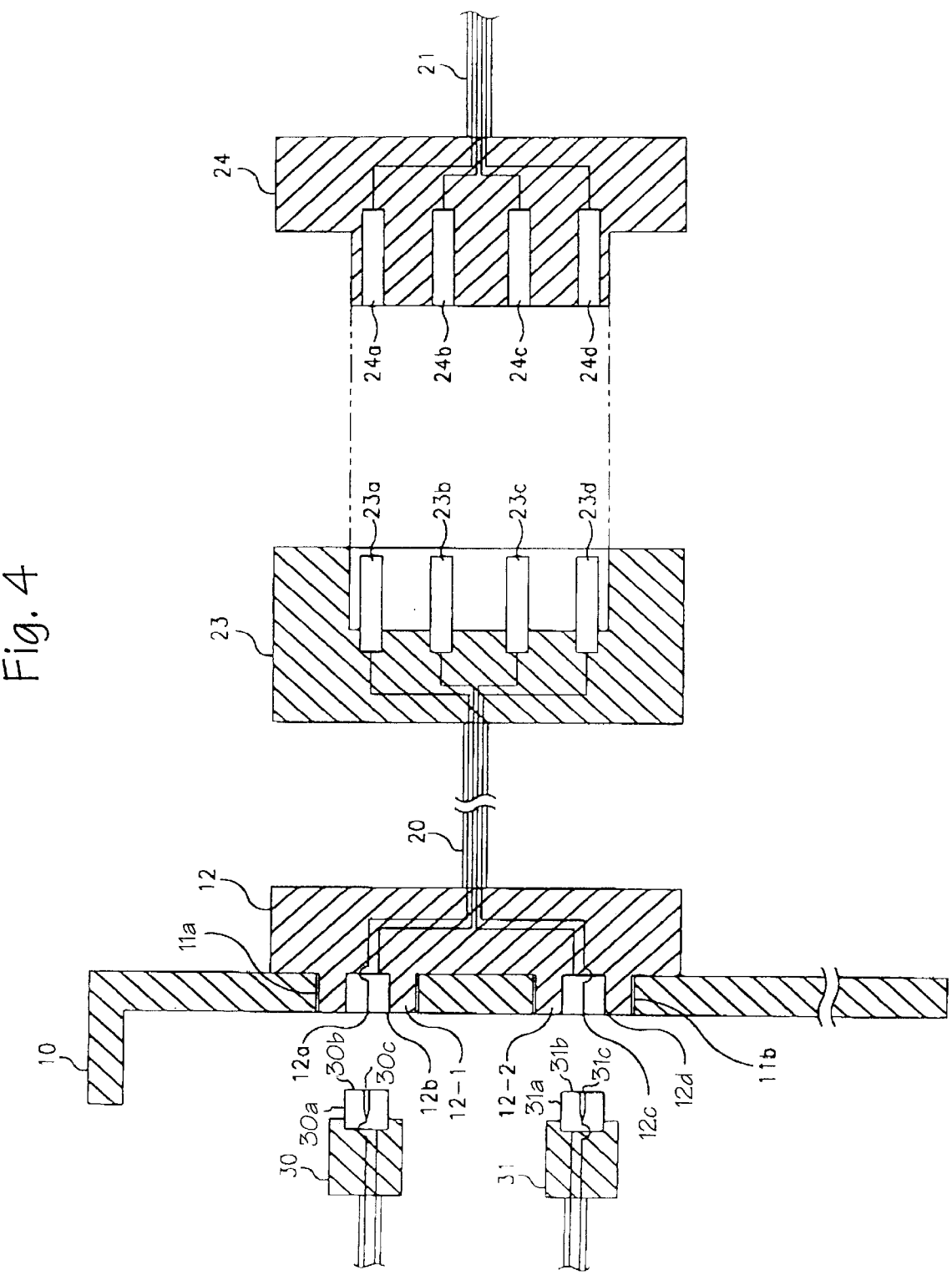

POWER CONNECTION BRACKET FOR COMPUTER SYSTEM AND COMPUTER SYSTEM HAVING THE SAME

CLAIM OF PRIORITY

This application makes reference to, incorporates the same herein, and claims all benefits accruing under 35 U.S.C. §119 from an application for BRACKET FOR COMPUTER SYSTEM earlier filed in the Korean Industrial Property Office on 22 Apr. 1996 and there duly assigned Serial No. 12200/1996.

FIELD OF THE INVENTION

The present invention relates to a bracket capable of using an internal supply voltage, and more particularly to a bracket designed to use only internal supply voltage, with no use of any adapter, to electrically connect computer system to peripheral devices.

BACKGROUND OF THE INVENTION

Peripheral devices are often attached to a host computer to receive data and sometimes power. For example, U.S. Pat. No. 5,187,645 for a Portable Computer With Docking Connector For Peripheral Devices to Spalding et al. discloses a portable computer with docking connector for peripheral devices. Connections to external components such as peripheral devices are achieved with one embodiment via a docking connector. A battery pack provides power to a keyboard, visual display and disk drives. Thus, a use of one power supply can be used to power several peripherals.

U.S. Pat. No. 5,301,346 for a Method and Apparatus For Transferring Data Between A Host Device and Plurality of Portable Computers to Notarianni et al. discloses a method and apparatus for transferring data between a host device and plurality of portable computers. The support frame includes a back panel, mounted on the divider panels, a plurality of data input/output connectors mounted on the back panel and a plurality of power connectors also mounted on the back panel. The data input/output connectors and the power connectors are positioned between adjacent divider panels and are adapted to mate with corresponding data and power connectors mounted on the pen based computers. The pen based computers are commonly as referred to as an electronic clip boards have become increasing popular forms of portable computers.

U.S. Pat. No. 1,278,997 for Supporting Bracket For Electrical Instruments to Pieper et al. discloses various electrical instrument brackets with electrical conductors that furnish a supply of current to the various instruments.

U.S. Pat. No. 5,106,322 for an Electrical Computer Connection System to Cesar discloses secondary connectors are electrically connected to a standard connector using separate cords of insulated electrical wires. The back panel of the peripheral has three connectors reserved for data, the electrical power and the command signals respectively. These three connectors are connected to an external connector which may be a standard connector fixed to a cartridge by system of lugs and screws.

U.S. Pat. No. 4,188,653 for an Electrical Component Mounting Package to Goepel discloses a printed circuit board with a plurality of spaced holes formed for passage of electrical wires and conductors therethrough to a conductive network on one side thereof An electrical component mounting package includes a printed circuit board in an electrical component in the form of a transformer and a plurality of separate electrical wires and a frame member of electrically insulating material. The frame member, the electrical wire and the transformer are all connected to the printed circuit board.

I have found that contemporary practice, as represented by these foregoing exemplars, lack a simplified and easy to manufacture assembly of parts that allows the power supply inside the chassis of a computer to power both internal components and external, peripheral components.

SUMMARY OF THE INVENTION

It is therefore an object to provide an apparatus that is simplified and allows a power supply residing inside the chassis of a main computer to supply power to both components located inside the chassis and to peripheral components located external to the chassis.

It is also an object to supply a bracket designed to use only internal supply voltage, without the use of an adapter, to connect computer system to peripheral devices, so as to avoid the problems above.

In order to accomplish these and other objects, a bracket, which is attached to an expansion slot of a computer system, may be made of a first connecting part, which is mounted to the outside of the bracket, for being connected to peripheral devices; and a second connecting part, which is mounted to the inside of the bracket, for being connected to power supply, while the second connecting part is electrically connected to the first connecting part. The first connecting part may be made of a plurality of connectors for output power. The second connecting part is made up of a connector for input power to be connected to a connector of the power supply unit.

According to another aspect of the present invention, a computer with a bracket capable of using internal supply voltage installed thereto is made up of a bracket having a first and second connecting parts for suppling internal supply voltage to external peripheral devices, a power supply in a computer which is connected to the bracket, and a housing that will accommodate the bracket and the power supply.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a detailed view showing the electrical connections according to an embodiment of the present invention.

DETAILED DESCRIPTION OF THE INVENTION

Generally, it requires separate external supply voltage to connect a computer system to external peripherals, such as an external modem, loudspeakers, and camera, etc., and to use them. That is to say, it is possible to use them only when after an AC voltage is converted into a DC voltage, the DC voltage is supplied to such external peripherals as described above. Therefore, the use of any electronic or electrical device requires an additional DC adapter to be prepared, and which leads to additional financial expenditure. Further, since a computer is not able to control power, switch on/off should be manually performed. In addition, as the number of external peripherals to be connected to the computer is increased, the more outlets are needed and which results in a complicated peripheral environment.

Figure 1A:
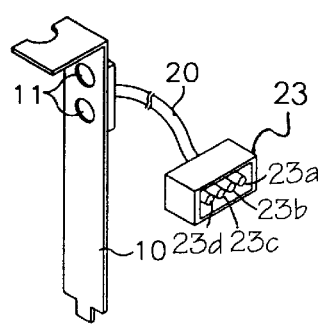
FIGS. 1A and 1B are perspective views showing the outside of and the inside of a bracket capable of using internal supply voltage according to an embodiment of the present invention.
Figure 1B:
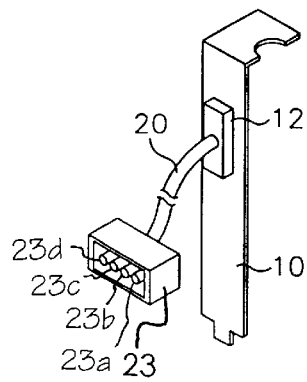

FIGS. 1a and 1b are perspective views showing the outside of and the inside of a bracket 10 respectively. Bracket 10 is capable of using internal supply voltage according to an embodiment of the present invention and FIG. 2 shows bracket 10 capable of using internal supply voltage and a power supply according to an embodiment of the present invention.

Figure 2:
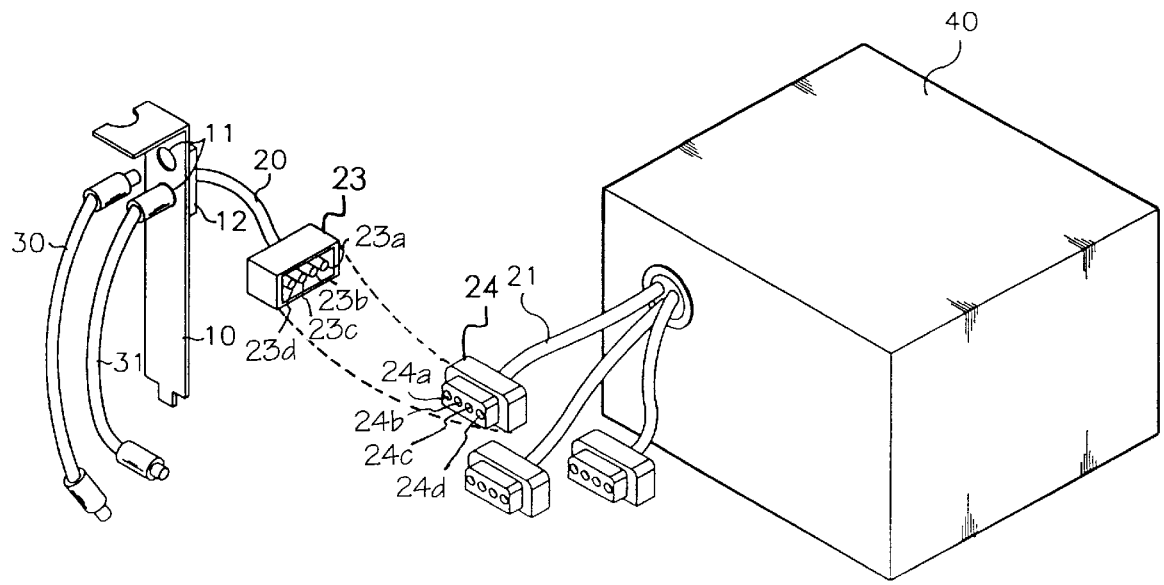
FIG. 2 is a perspective view showing a bracket capable of using internal supply voltage and a power supply according to an embodiment of the present invention.

As shown in FIGS. 1 and 2, a bracket 10 which is attached to an expansion slot of a computer system is made up of a first connecting part 12, which is mounted to the inside of the bracket 10, for through apertures or holes 11 in bracket 10 connected to peripheral devices, and a second connecting part 12, which is located to the inside of the bracket 10, for being connected to power supply 40, where the bracket 10 is capable of using the internal voltage supply of a computer system. First connecting part 12 through apertures 11 engage a plurality of connectors for output power 30, 31 and the first connecting part 12 is connected to lead cable 20 which connects to connector or second connecting part 23. Connector 23 attaches to connector 24 which is connected to power supply 40 via cable 21. Connector 23 contains four male leads referred to as 23a, 23b, 23c, and 23d. These four male leads connect to female leads 24a, 24b, 24c, and 24d respectively of connector 24.

Figure 3:
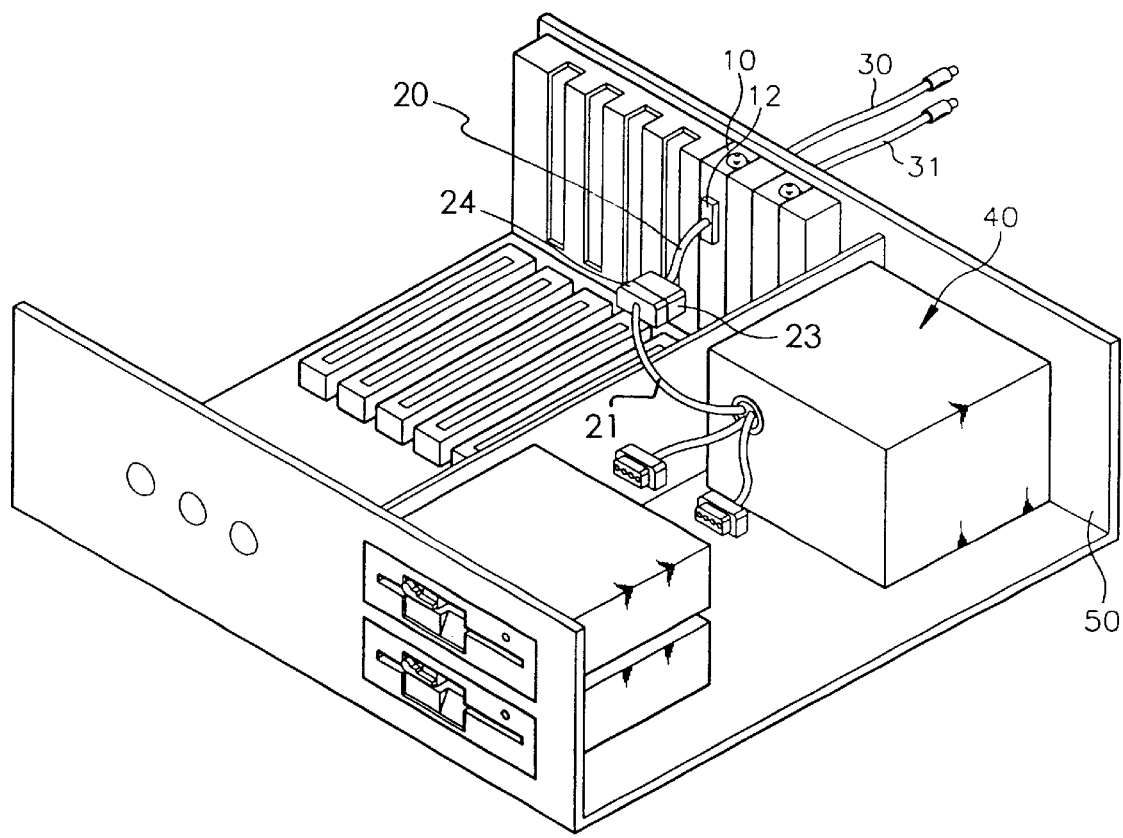
FIG. 3 is a perspective view of a computer having a bracket capable of using internal supply voltage installed thereto according to an embodiment of the present invention.

FIG. 3 is a perspective view of a computer housing 50 having a bracket 10 capable of using internal supply voltage installed thereto according to an embodiment of the present invention. As shown in FIG. 3, a computer with a bracket 10 capable of using an internal supply voltage installed thereto is made up of a bracket having a first and second connecting parts 12 and 23 for suppling internal supply voltage to external peripheral devices, power supply 40 in computer housing 50 which is connected to bracket 10 when a computer is powered, and housing 50 that will accommodate the bracket 10 and the power supply 40.

The functions of the bracket according to an embodiment of the present invention will be described. In general, power supply 40 has a plurality of connectors 24 emerging from power supply 40 for driving of a hard disk and floppy disk. The disks use 5 V DC and 12 V DC. Referring again to FIG. 1, the mount of the bracket 10 to a computer permits an operator to connect a computer to peripheral devices without using an adaptor. The first and second connecting parts 12 and 23, respectively are designed to connect connectors for output power 30 and 31 and cable 20. In addition, at least one bracket 10 is provided with a computer system so that it can be connected to external peripheral devices.

FIG. 3 shows cable 21 connected to connector 24 and cable 20 connected to connector 23. By connecting connector 24 to connector 23 as shown in FIG. 3, cable 21 emerging from power supply 40 is electrically connected to cable 20 emerging from bracket 10.

FIG. 4 shows a detailed view of the electrical connections surrounding bracket 10 and connectors 23 and 24. Electrical connectors 12a and 12b found within hole 11a connect with connectors 30c and 30a respectively of connector 30. Insulators 12-1 of hole 11a and 30b of connector 30 prevent shorting between the 5 V power supply and ground.

Meanwhile, the 12 V DC power supply exits connector 12 through hole 11b, and is transmitted to a peripheral through connector 3 1. Electrical connectors 12c and 12d found within hole 11b connect to connectors 31c and 31a respectively of connector 30. Insulators 12-2 of hole 11b and 31b of connector 31 prevent the 12 V DC power supply from shorting to ground.

To summarize the electrical connections, the +5 V DC power is supplied by cable 21 to female lead 24a of connector 24. Female lead 24a connects to male lead 23a of connector 23 which, in turn is connected via cable 20 to lead 12a. Lead 12a connects with 30c of connector 30, delivering +5 V DC to a peripheral device.

The ground terminal for the +5 V DC power supply is supplied by cable 21 to female lead 24b of connector 24. Female lead 24b connects to male lead 23b of connector 23 which, in turn is connected via cable 20 to lead 12b. Lead 12b connects with 30a of connector 30, delivering ground voltage to a peripheral device receiving +5 V DC.

The +12 V DC power is supplied by cable 21 to female lead 24c of connector 24. Female lead 24c connects to male lead 23c of connector 23 which, in turn is connected via cable 20 to lead 12c. Lead 12c connects with 31c of connector 31, delivering +12 V DC to a peripheral device.

The ground terminal for the +12 V DC power is supplied by cable 21 to female lead 24d of connector 24. Female lead 24d connects to male lead 23d of connector 23 which, in turn is connected via cable 20 to lead 12d. Lead 12d connects with 31a of connector 31, delivering ground potential to a peripheral receiving +12 V DC.

The advantage of mounting the bracket of the present invention to a computer system is that this bracket uses internal supply voltage and, therefore, additional expenditure is not required and automatic power on/off leads to easy use of the computer system. Further, no use of additional an adaptor helps an operator to connect external peripherals to a computer system with no difficulty and needs less outlets. Additionally, it is possible to mount the bracket to a computer system with no existing computer power device.

What is claimed is:

1. A computer system, comprising:

a computer chassis;

a power supply located within said computer chassis and having a plurality of connectors for access to said power supply;

a plurality of electronic components located within said computer chassis, said plurality of electronic components for connection to corresponding said plurality of connectors of said power supply for operation;

a bracket mounted on one side of said computer chassis for supplying power from said power supply to at least one external peripheral device;

first connector mounted on said bracket for receiving at least one output power connector for supplying power to said at least one external peripheral device;

a second connector electrically coupled to said first connector, for electrically mating with one of said plurality of connectors from said power supply to supply power from said power supply to said at least one external peripheral device.

2. The computer system of claim 1, wherein said bracket has a plurality of apertures for receiving a plurality of output power connectors to supply power from said power supply to a plurality of external peripheral devices.

3. The computer system of claim 1, wherein all but one of said plurality of connectors from said power supply are for connection to said plurality of electronic components in said computer chassis.

4. A computer system capable of using an internal supply voltage installed in said computer system for operation of at least one external peripheral device, said computer system comprising:

a computer chassis;

a bracket assembly mounted on one side of said computer chassis, for supplying said internal supply voltage to said at least one external peripheral device; and an internal power supply installed in said computer chassis and connected to the bracket assembly for applying electrical power to said computer system and for supplying said internal supply voltage to said at least one external peripheral device.

5. The computer system of claim 4, wherein said bracket assembly comprises:

a bracket mounted on said one side of said computer chassis, said bracket having at least one aperture for receiving at least one corresponding output power connector for said at least one external peripheral device;

a first connector mounted on said bracket for receiving said at least one corresponding output power connector;

a second connector having a plurality of lead pins for connection with said internal power supply of said computer system for supplying power from said internal power supply to said at least one of external peripheral device via said at least one corresponding output power connector; and a connection cable for electrically coupling through said first connector each said corresponding output power connector to respective ones of said plurality of lead pins of said second connector.

6. The computer system of claim 5, wherein said bracket has a L-shaped structure for installation on said one side of said computer chassis.

7. A computer system, comprising:

a computer chassis;

a plurality of electronic components located within said computer chassis, said plurality of electronic components for operation having power connection with an internal power supply of said computer system; and a bracket assembly mounted on one side of said computer chassis for supporting power connection of said computer system to peripheral devices, said bracket assembly comprising:

a L-shaped bracket having a plurality of apertures;

a first connector having a plurality of electrical sockets positioned on said bracket in juxtaposition to said plurality of apertures;

a second connector having a plurality of lead pins for connection with the internal power supply of said computer system for supplying power from said internal power supply to at least one of said peripheral devices via said electrical sockets; and a cable attached to and leading from said first connector to said second connector, electrically coupling each one of said plurality of electrical sockets to respective ones of said plurality of lead pins.

* * * * *